No. 713,300. Patented Nov. 11, 1902.
C. N. E. GRAY.
BROADCAST SEEDING MACHINE.
(Application filed Apr. 4, 1900.)
(No Model.) 3 Sheets—Sheet 1.
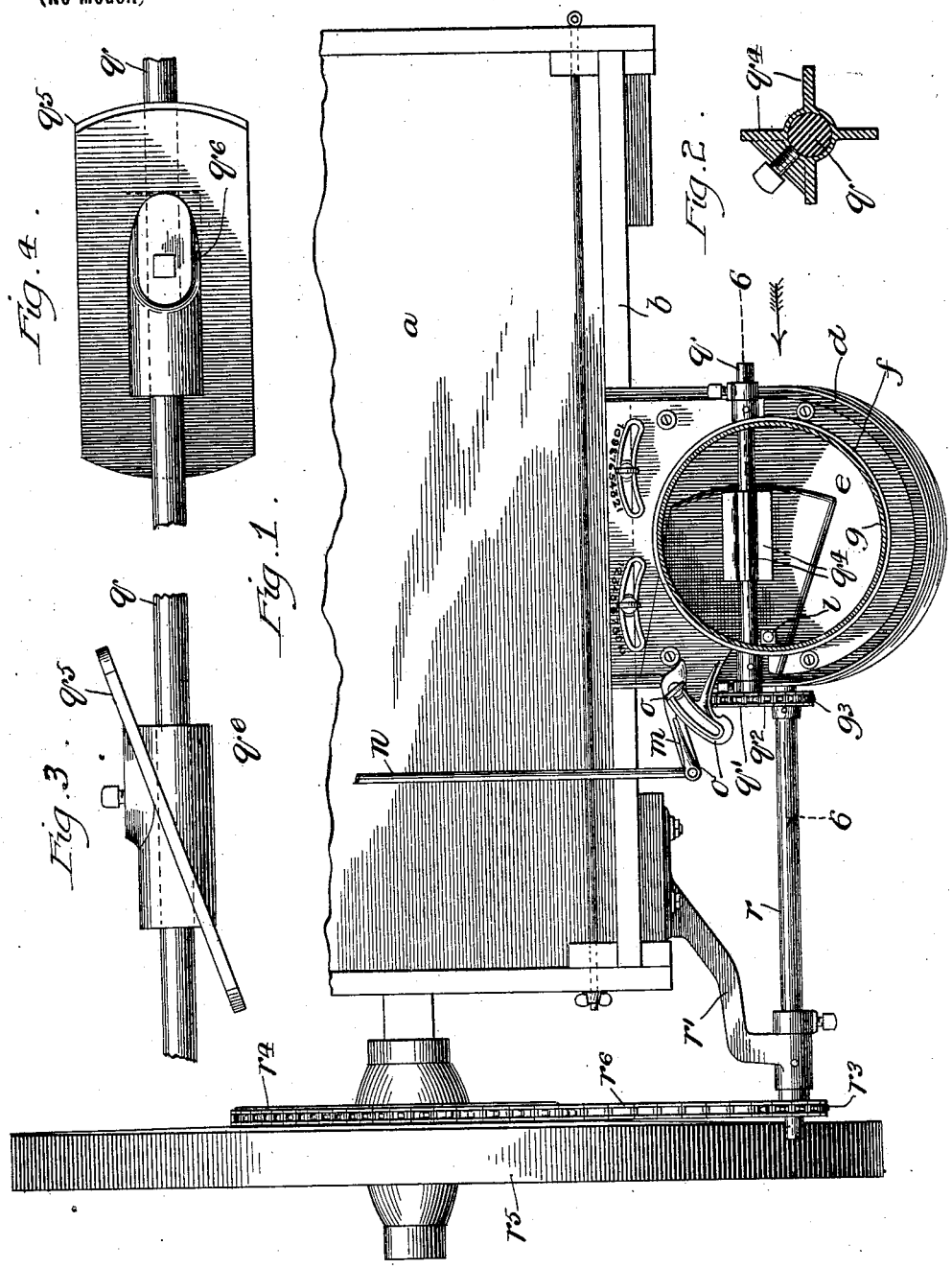
Witnesses:
Frank S. Blanchard
Harold J. Bartlett
Inventor:
Christian N. E. Gray
By Henry Frankfurter
his Attorney

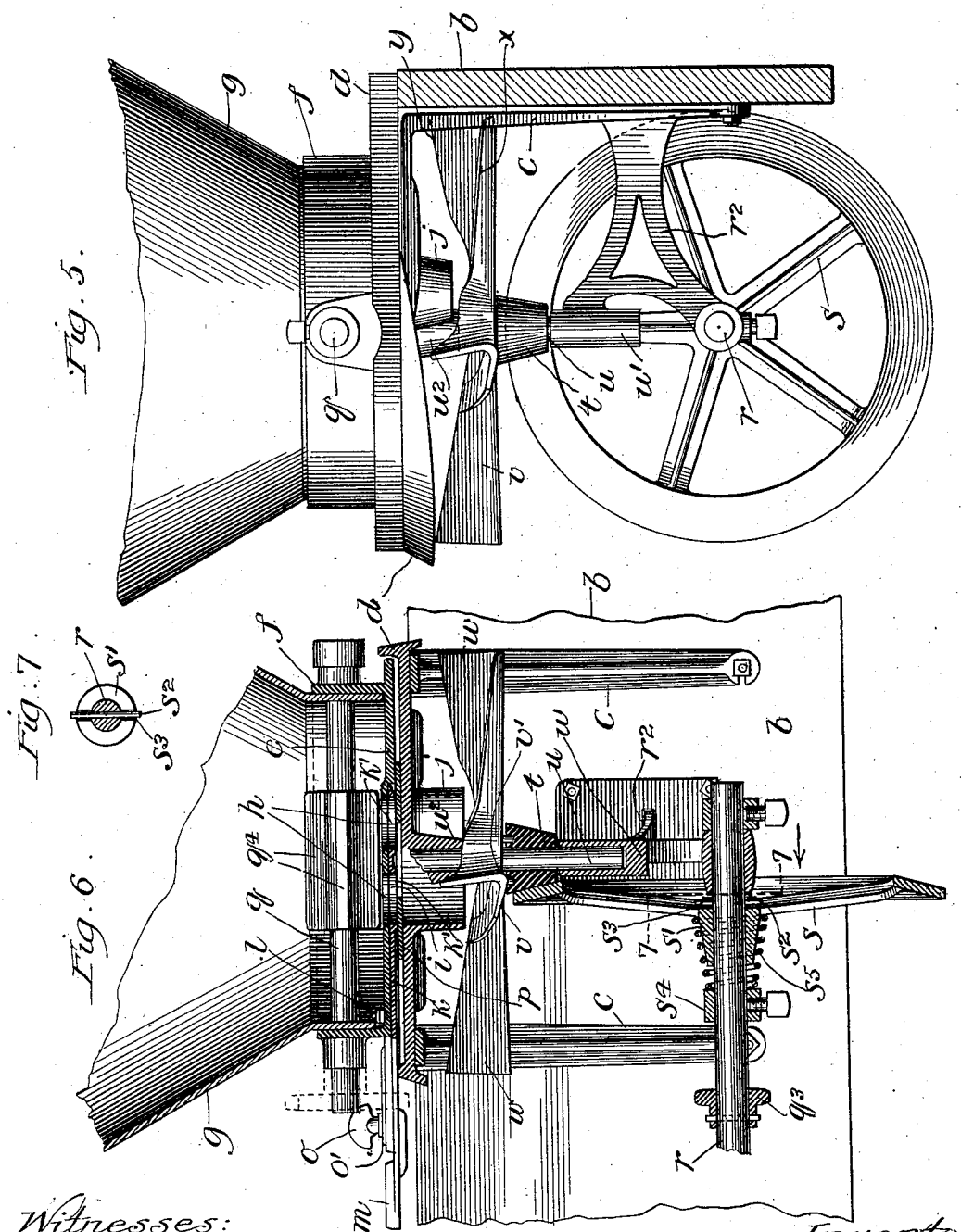

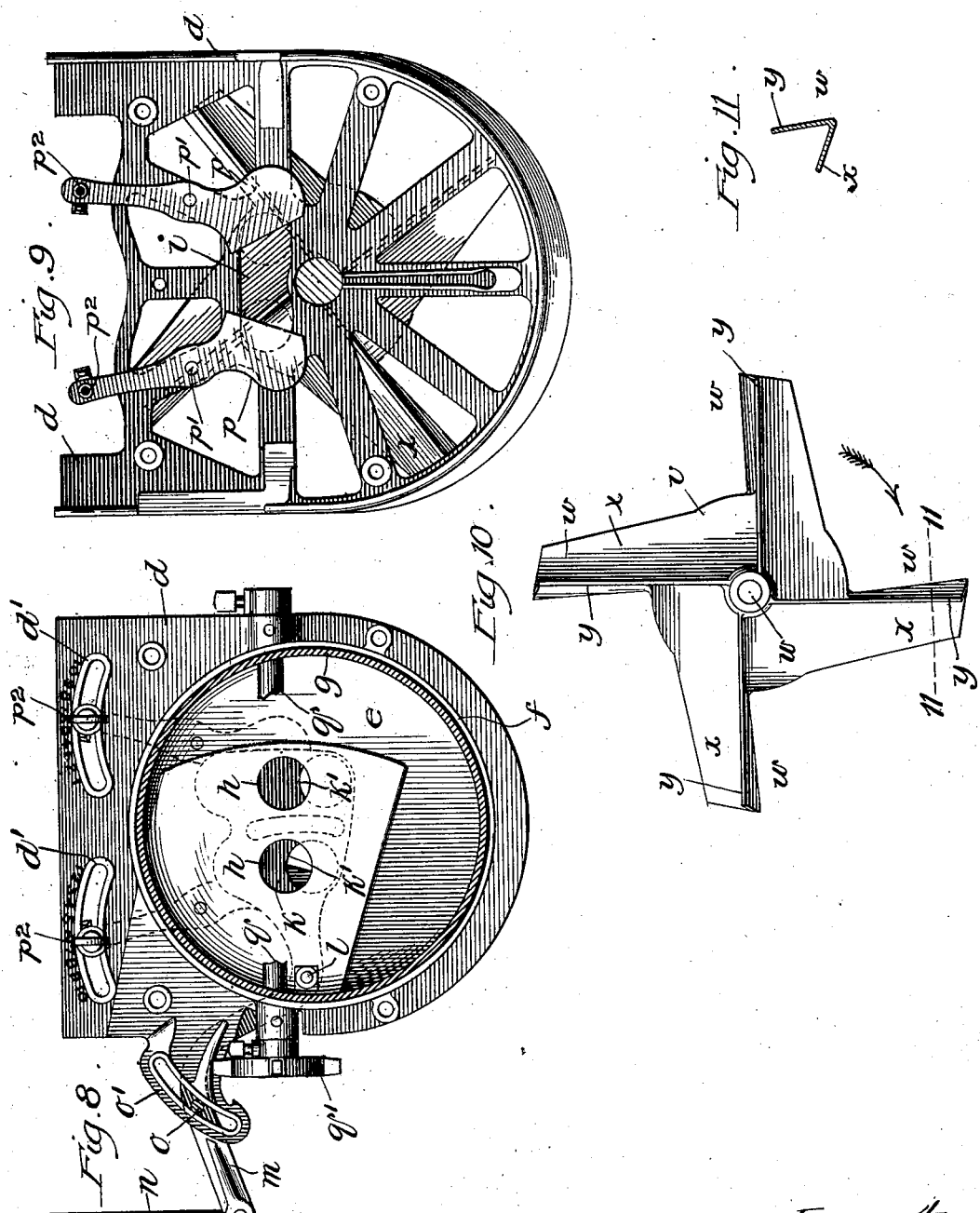

UNITED STATES PATENT OFFICE.

CHRISTIAN N. E. GRAY, OF CHICAGO, ILLINOIS, ASSIGNOR OF ONE-HALF TO JOHN P. MULVANEY, OF CHICAGO, ILLINOIS.

BROADCAST SEEDING-MACHINE.

SPECIFICATION forming part of Letters Patent No. 713,300, dated November 11, 1902.

Application filed April 4, 1900. Serial No. 11,479. (No model.)

*To all whom it may concern:*

Be it known that I, CHRISTIAN N. E. GRAY, a citizen of the United States, and a resident of the city of Chicago, in the county of Cook and State of Illinois, have invented certain new and useful Improvements in Broadcast Seeding-Machines, of which the following is a full, clear, and exact description, reference being had to the accompanying drawings, forming a part of this specification, in which—

Figure 1 is a plan view, partly in section, of a device embodying the features of my invention. Fig. 2 is a transverse sectional view in detail of the force feeding mechanism. Fig. 3 is a detail view showing a modification of the force feeding mechanism. Fig. 4 is a view showing said modified device in a different position. Fig. 5 is a side view of my improved seeding device viewed from the direction as indicated by the arrow shown in Fig. 1. Fig. 6 is a vertical sectional view thereof, taken upon the line 6 6, Fig. 1. Fig. 7 is a sectional view in detail of the main driving-shaft, taken upon the line 7 7, Fig. 6, viewed in the direction of the arrow there shown. Fig. 8 is a plan view of the bottom of the hopper, the walls thereof being shown in section and the force feed mechanism removed. Fig. 9 is a plan view of the lower portion of the device, the bottom of the hopper being removed to show the regulating-shutters or cut-offs. Fig. 10 is a plan view in detail of the distributing-fan; and Fig. 11 is a sectional view in detail of one of the wings of the fan, the same being taken upon the line 11 11, Fig. 10.

Corresponding letters of reference in the different figures of the drawings indicate like parts.

The objects of my invention are to provide an improved broadcast seeding-machine which shall be practically noiseless in its operation, to provide more efficient driving means for operating the distributing-fan, to provide a distributing-fan of improved construction, and to provide improved feed mechanism for supplying seed to the distributing-fan. I accomplish these objects as hereinafter described. What I regard as new is set forth in the claims.

Referring to the drawings, $a$, Fig. 1, represents the box of an ordinary farm-wagon, to the end-board $b$ of which are attached brackets $c\ c$, Figs. 5 and 6, upon which is mounted the supporting base-plate $d$ of my improved machine. Above said supporting base-plate and mounted upon suitable bosses or other supports (not shown) is a plate $e$, Figs. 1, 6, and 8, which forms the bottom plate of the grain-receiver, which is provided with an annular flange $f$, within which is inserted, as shown, the lower portion of a hopper $g$. The bottom plate $e$ is provided with openings $h\ h$, which are located above an enlarged opening $i$, Figs. 6 and 9, from which latter depends a flange or spout $j$. (Shown in Figs. 5 and 6.) Located between the base-plate $b$ and the bottom plate $e$ and loosely adjusted therein is a shutter-plate $k$, which is pivoted at $l$, Figs. 1, 6, and 8, and has an arm $m$ extending outside of the casing, the outer end of which arm is connected with a rod $n$, Figs. 1 and 8, which is extended forward to the driver's seat, by whom it may be operated directly or in conjunction with a suitable lever. (Not shown.) The plate $k$ is provided with openings $k'\ k'$ therein, which are adapted to register with the openings $h\ h$ in the bottom plate $e$ when the plate $k$ is in its normal position—that is, when the machine is in operation. When the arm is drawn forward, however, by the rod $n$, the feed-openings $h\ h$ may be entirely closed by the intervention of the plate $k$. A set-screw $o$, Figs. 1, 6, and 8, engaging with a laterally-extended plate $o'$, having a curved slot therein, as shown, enables the arm $m$ to be locked in any desired position. This feature is especially desirable when the hopper is filled with grain and the machine is being moved but is not in operation. Between the base-plate $d$ and the plate $k$ I place regulating-shutters $p\ p$, (shown in Figs. 6 and 9 and indicated in dotted lines in Fig. 8,) which shutters are pivoted at $p'\ p'$, Fig. 9. Suitable arms are extended rearwardly therefrom, in which are secured bolts arranged to pass upwardly through curved slots $d'\ d'$ in the plate $d$, to which they may be secured in any desired position by means of thumb-nuts $p''\ p''$. Suitable indicators upon the arms and figures upon the plate, as shown, enable the shutters $p\ p$ to be adjusted to the corresponding relative positions.

Extending diametrically through the circular flange $f$ and journaled in suitable bearings formed thereon, as shown in Figs. 1, 5, 6, and 8, is a horizontal shaft $q$, upon the left-hand end of which is mounted a sprocket-wheel $q'$, connected, by means of a sprocket-chain $q''$, to a sprocket-wheel $q'''$, Figs. 1 and 6, upon a driving-shaft $r$, hereinafter referred to. Mounted upon the shaft $q$ over the feed-openings $h$ is a feeding device consisting of a sleeve upon which are formed vanes $q''''$, Figs. 1, 2, and 6. Said sleeve is secured rigidly to the shaft by means of a set-screw or otherwise, and the rotation of the vanes as the shaft is revolved serves to force the grain in the hopper through the feed-openings $h$. In the views referred to I have shown the vanes to be in the plane of the axis of the shaft; but in Figs. 3 and 4 I have shown a modified construction, in which vanes $q'''''$ are formed upon sleeves $q''''''$, which vanes are arranged obliquely to the axis of the shaft. The shaft $r$ is the main driving-shaft and is supported in bearings upon brackets $r'$ and $r''$, which extend rearwardly from and are rigidly attached to the end-board $b$, as shown in Figs. 1, 5, and 6. A small sprocket-wheel $r'''$, Fig. 1, upon the end of the shaft $r$ is connected with a large sprocket-wheel $r''''$, attached rigidly to the rear wagon-wheel $r'''''$ by means of a sprocket-chain $r''''''$, thereby enabling the shaft $r$ to be driven with considerable speed. Mounted upon the shaft $r$ is a large beveled friction gear-wheel $s$, the hub $s'$ of which is adjusted loosely upon said shaft, so as to permit of longitudinal movement, but is caused to rotate with said shaft by means of a pin $s''$, which is adapted to engage with a notch $s'''$, Figs. 6 and 7, which permits of a slight longitudinal movement of the hub without disengagement. A collar $s''''$ is adjustably secured to said shaft by means of a set-screw, between which collar and the hub is interposed a spiral spring $s'''''$, the tension of which serves to press the beveled portion of the friction-gear against the face of a corresponding pinion $t$, having a frictional surface, which pinion is rigidly attached to a vertical shaft $u$, the lower end of which is journaled in a bearing $u'$ upon the bracket $r''$, while the upper end is journaled in a bearing $u''$, depending from and formed upon the plate $d$. The friction-wheel $s$ is preferably formed from metal, while I prefer to make the pinion $t$ from compressed fiber, vulcanite, or other material adapted to form a suitable frictional surface, so that contact with the wheel $s$ may insure its rotation. Upon the shaft $u$ is mounted a fan $v$, Figs. 5, 6, and 10, which may be secured in place by means of pins $v'$, Fig. 6, interposed between it and the pinion $t$. Said fan consists of four radial vanes $w$, placed at right angles to each other. Each vane consists of a trough-like structure open at its outer end, but having a cross-section substantially like that shown in Fig. 11, the lower member $x$ of which is oblique to the plane of the horizon and inclined downwardly toward its junction with its fellow, while the member $y$ is oblique to the plane of the axis of the shaft $u$, the top being extended forward in the direction of its rotation, which direction is indicated by the arrow shown in Fig. 10. Said fan is shown in Fig. 9, which figure clearly shows its location with respect to the position of the feed-openings $h\ h$, which are placed forward and in planes upon each side of the shaft $u$.

The operation of my improved device is as follows: The shaft $u$ being rotated at a high speed, the grain is fed from the hopper so as to drop upon the distributing-fan forward and in planes upon opposite sides of its axis. The result is that the grain falls in the trough of the vane pointing forward and also in that of the one immediately behind it, but not in the others, and inasmuch as the grain is delivered from the ends of the troughs it does not commence to escape until the vane upon which it falls assumes a position nearly if not substantially parallel to the end-board $b$. The result of this action is that none of the grain is thrown forward against said end-board, while all of it is delivered before the vane arrives in position to receive another charge, thereby resulting in an even and uniform distribution. The reason why the grain is not delivered until it reaches the end of the vanes is owing to the construction of said vanes, in which the members $y$ flare forwardly and the members $x$ flare upwardly, the degree of the forward flare of the member $y$ being regularly increased toward its outer end, as shown in Fig. 10. By entirely closing one or the other of the parts $p$ the flow of grain may be permitted to descend upon either side of the distributing-fan, as desired, while the advantage of being able to shut off the flow of grain entirely or to open and close the shut-off valve from the driver's seat while the wagon is in motion is too obvious to require further comment. Moreover, the noiseless feature of the machine resulting from the use of the construction set forth is of great importance.

Having thus described my invention, what I claim as new, and desire to secure by Letters Patent, is—

1. In a broadcast seeding device, the combination of a hopper, a distributing-fan mounted upon a vertical shaft beneath said hopper, a friction-wheel mounted upon said vertical shaft in contact with a friction-wheel mounted upon a horizontal driving-shaft, and a spring mounted upon one of said shafts in operative connection with one of said wheels for pressing such wheel yieldingly against its fellow, and means in operative connection with said vehicle for actuating said wheels, substantially as described.

2. In a device of the class described, the combination of a hopper, a distributing-fan beneath said hopper mounted upon a vertical shaft, a friction-wheel mounted upon said shaft, a horizontal driving-shaft, a friction-wheel mounted thereon so as to move longitudinally upon said shaft, and a spring upon said shaft for pressing said wheel yieldingly in frictional contact against its fellow, substantially as described.

3. In a broadcast seeding device, the combination of a hopper having a discharge opening or openings in its bottom, a seed-distributer under the hopper, a horizontal shaft extended into the hopper above the bottom thereof, vanes carried by said shaft, said vanes lying above and adjacent to the discharge-opening, and means for rotating the shaft, substantially as described.

4. In a broadcast seeding device, the combination of a hopper having a discharge-opening in its bottom, a seed-distributer under the hopper, a horizontal shaft extended into the hopper above the discharge-opening thereof, vanes carried by said shaft, said vanes being arranged obliquely to the axis of the shaft, and lying above and adjacent to the discharge-opening, and means for rotating said shaft, substantially as described.

5. In a broadcast seeding device, the combination of a hopper, a distributing-fan mounted upon a vertical shaft beneath said hopper, said distributing-fan having a plurality of conjoined approximately radial wings, each of the wings being composed of an upwardly-extended and forwardly-inclined member and a forwardly-extended and upwardly-inclined member, substantially as described.

6. A fan for broadcast seeders, comprising a plurality of conjoined approximately radial wings, each of the wings being composed of an upwardly-extended and forwardly-inclined member and a forwardly-extended and upwardly-inclined member, substantially as described.

7. In a device of the class described, the combination of driving and fan-supporting shafts, of coacting friction-gears, and means in operative connection with one of said gears for exerting a yielding pressure against its fellow, substantially as and for the purposes specified.

8. A broadcast seeding-machine consisting of a rotary seed-distributer, means for supplying seed thereto, coacting friction-wheels for rotating said seed-distributer, and means for holding said friction-wheels yieldingly in contact with each other, substantially as described.

9. A broadcast seeding-machine, consisting of a rotary seed-distributer, means for supplying seed thereto, a shaft on which said seed-distributer is mounted, a friction-wheel mounted on said shaft, a second friction-wheel adapted to frictionally engage said first-mentioned friction-wheel for driving the same, and means for holding said friction-wheels yieldingly in contact with each other, substantially as described.

10. A broadcast seeding-machine consisting of a rotary seed-distributer, means for supplying seed thereto, a friction-wheel connected with said seed-distributer, a drive-shaft, a second friction-wheel mounted on said drive-shaft and adapted to frictionally engage said first-mentioned friction-wheel for rotating said seed-distributer, said second friction-wheel being movable longitudinally of the drive-shaft, and means yieldingly holding said friction-wheels in engagement with each other, substantially as described.

CHRISTIAN N. E. GRAY.

Witnesses:
HENRY FRANKFURTER,
A. A. McKINLEY.